US012756003B2

(12) United States Patent

Leray et al.

(10) Patent No.: US 12,756,003 B2

(45) Date of Patent: Oct. 6, 2026

(54) STRUCTURAL ELECTROCHEMICAL STORAGE ASSEMBLY FOR A MOTOR VEHICLE

(71) Applicant: RENAULT S.A.S, Boulogne Billancourt (FR)

(72) Inventors: David Leray, Guyancourt Cedex (FR); Thierry Tourret, Guyancourt Cedex (FR)

(73) Assignee: AMPERE S.A.S., Boulogne Billancourt (FR)

( * ) Notice: Subject to any disclaimer, the term of this patent is extended or adjusted under 35 U.S.C. 154(b) by 647 days.

(21) Appl. No.: 18/253,453

(22) PCT Filed: Nov. 22, 2021

(86) PCT No.: PCT/EP2021/082423

§ 371 (c)(1), (2) Date: May 18, 2023

(87) PCT Pub. No.: WO2022/112147

PCT Pub. Date: Jun. 2, 2022

(65) Prior Publication Data

US 2023/0402643 A1 Dec. 14, 2023

(30) Foreign Application Priority Data

Nov. 26, 2020 (FR) ..................................... 20 12167

(51) Int. Cl.

*H01M 50/249* (2021.01)
*B60R 16/04* (2006.01)

(Continued)

(52) U.S. Cl.

CPC ......... *H01M 10/0481* (2013.01); *B60R 16/04* (2013.01); *H01M 50/209* (2021.01);

(Continued)

(58) Field of Classification Search

CPC ......... H01M 2220/20; H01M 10/0481; H01M 50/249; H01M 50/262; H01M 50/209;

(Continued)

(56) References Cited

U.S. PATENT DOCUMENTS

| | | | |
|---|---|---|---|
| 2020/0058909 | A1 | 2/2020 | Sakai et al. |
| 2020/0328385 | A1 | 10/2020 | Hou et al. |
| 2021/0119250 | A1 | 4/2021 | Taniuchi et al. |

FOREIGN PATENT DOCUMENTS

| | | | |
|---|---|---|---|
| EP | 3 723 158 | A1 | 10/2020 |
| FR | 2 985 690 | A3 | 7/2013 |
| WO | WO 2019/187940 | A1 | 10/2019 |

OTHER PUBLICATIONS

International Search Report issued Feb. 18, 2022 in PCT/EP2021/082423, filed on Nov. 22, 2021 (English translation), 2 pages.

(Continued)

*Primary Examiner* — Uyen M Tran

(74) *Attorney, Agent, or Firm* — Oblon, McClelland, Maier & Neustadt, L.L.P.

(57) ABSTRACT

A structural electrochemical storage assembly for a motor vehicle includes an electrochemical energy storage device including at least a group of two banks of solid electrochemical storage elements, the banks being superposed on top of one another, and at least one piece made of compressible material, which is positioned and compressed between the at least two superposed banks of electrochemical storage elements, and a beam including two profile sections hollowed out and open on one of their faces and assembled with one another via their respective open face and along their respective edges, the profile sections containing the device of the at least two superposed banks of electrochemical storage elements, and the two profiled elements being dimensioned and assembled so as to keep the (Continued)

piece of compressible material that is positioned between the two superposed electrochemical banks compressed.

10 Claims, 6 Drawing Sheets

(51) Int. Cl.

| | |
|---|---|
| ***H01M 10/04*** | (2006.01) |
| ***H01M 50/209*** | (2021.01) |
| ***H01M 50/224*** | (2021.01) |
| ***H01M 50/242*** | (2021.01) |
| ***H01M 50/262*** | (2021.01) |
| ***H01M 50/503*** | (2021.01) |
| ***H01M 50/509*** | (2021.01) |
| ***H01M 50/517*** | (2021.01) |
| ***H01M 50/588*** | (2021.01) |
| ***H01M 50/593*** | (2021.01) |

(52) U.S. Cl.
CPC ....... *H01M 50/224* (2021.01); *H01M 50/242* (2021.01); *H01M 50/249* (2021.01); *H01M 50/262* (2021.01); *H01M 50/503* (2021.01); *H01M 50/509* (2021.01); *H01M 50/517* (2021.01); *H01M 50/588* (2021.01); *H01M 50/593* (2021.01); *H01M 2220/20* (2013.01)

(58) Field of Classification Search
CPC ............. H01M 50/242; H01M 50/517; H01M 50/509; H01M 50/503; H01M 50/224; H01M 50/588; H01M 50/593
See application file for complete search history.

(56) References Cited

OTHER PUBLICATIONS

French Preliminary Search Report Issued Aug. 17, 2021 in French Application 20 12167 filed on Nov. 26, 2020 (with English Translation of Categories of Cited Documents), 3 pages.

Fig.6
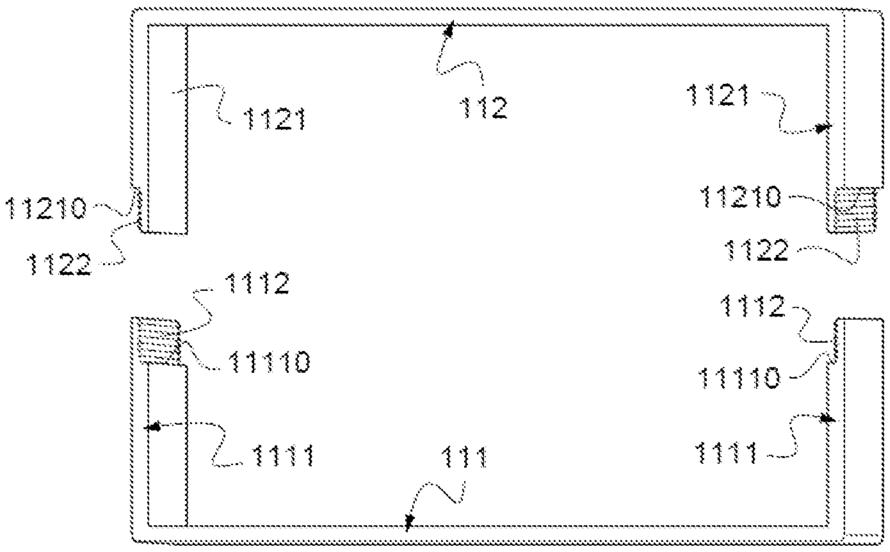
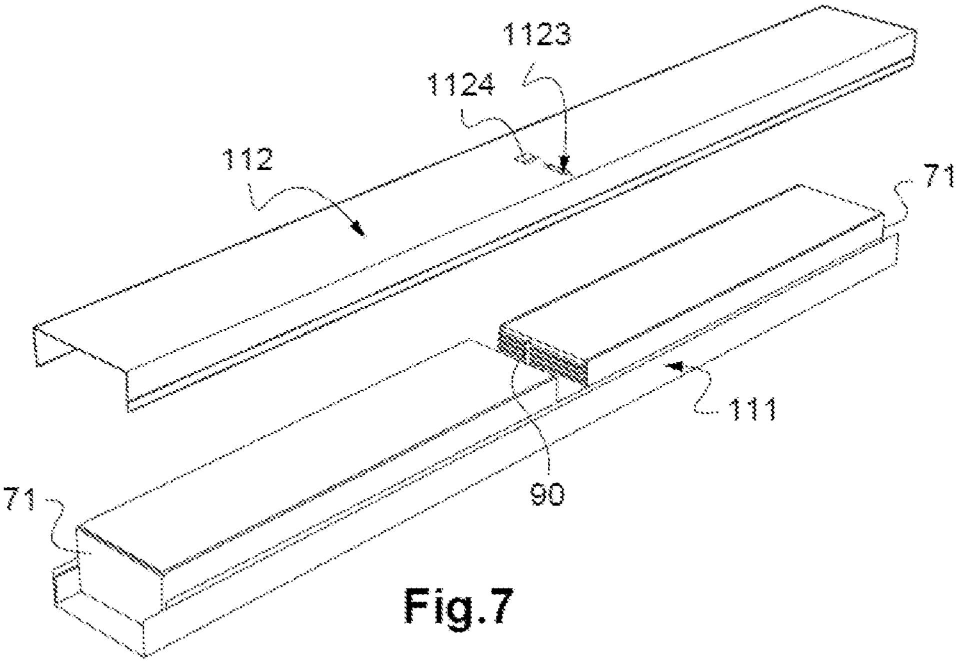
Fig.7

Fig.8
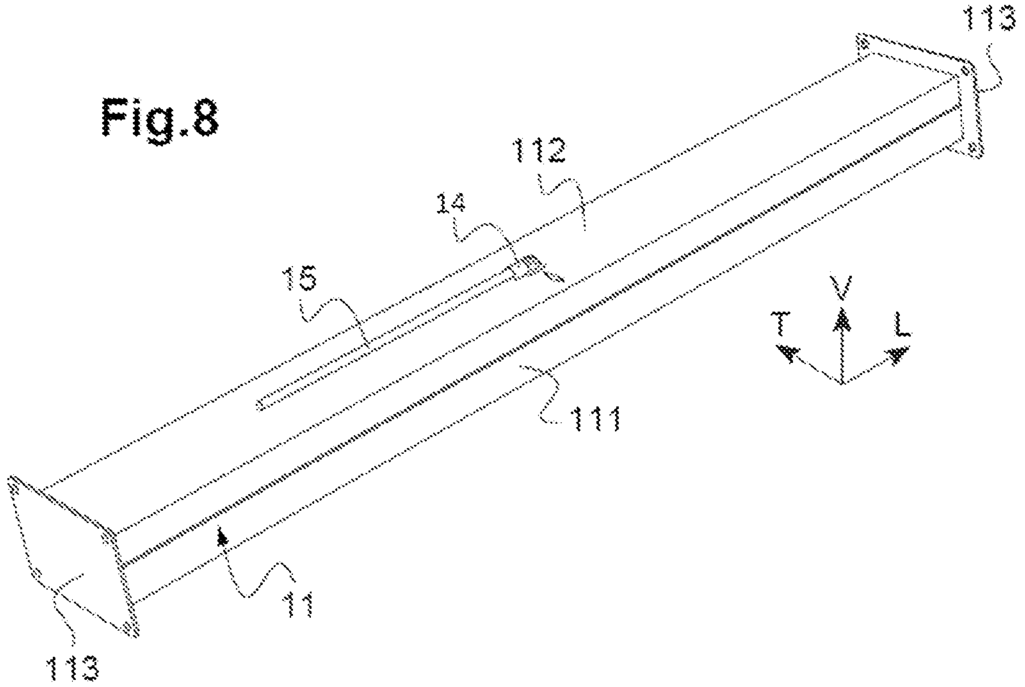
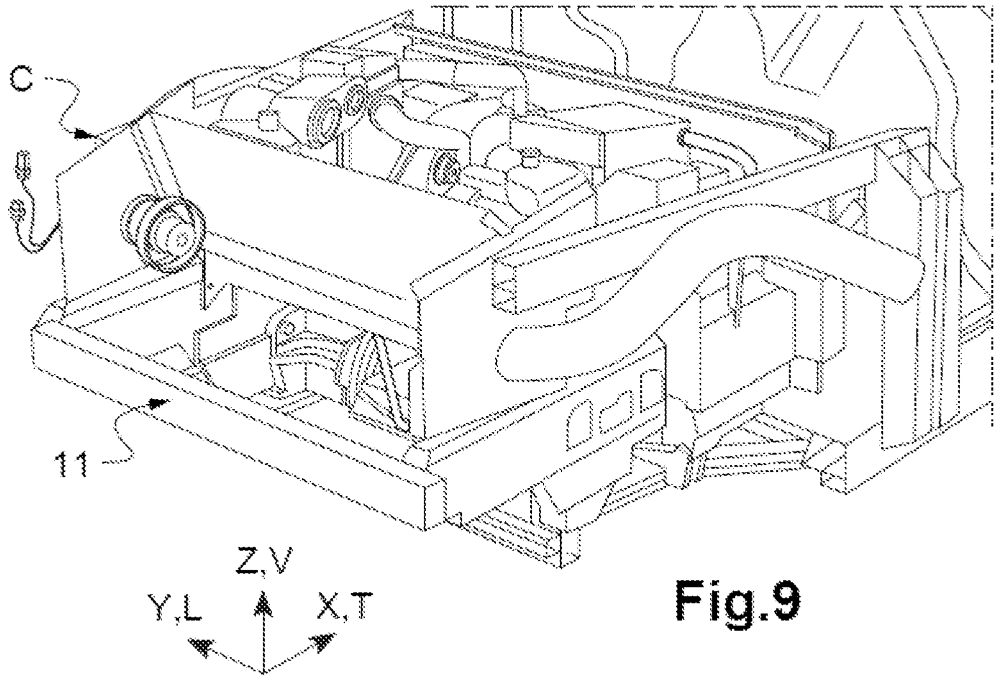
Fig.9

STRUCTURAL ELECTROCHEMICAL STORAGE ASSEMBLY FOR A MOTOR VEHICLE

BACKGROUND

The invention relates to a structural electrochemical storage assembly, in particular to a structural and electrical energy storage assembly of a motor vehicle.

The development of hybrid thermal/electric or all-electric vehicles requires having batteries which are more powerful and therefore larger, which presents problems involving increasing the weight of the vehicle and the space taken up in the vehicles.

Furthermore, it is advantageous to provide electrical energy storage elements which, as a result of their constitution and their location in the vehicle, provide greater safety, in particular in the event of an accident.

There has been proposed in the patent application WO2016127122 (EP3254323) a multifunctional electrochemical energy storage assembly which includes electrochemical cells and which can be incorporated as a structural component, for example, in the form of a beam with a cell coupling 3S1P, in the chassis of an electric vehicle. This assembly comprises a stack of electrodes in which there are integrated transverse reinforcement elements which are incorporated in perforations which extend through the assembly. Although it is envisaged that this assembly may where applicable include solid or semi-solid electrochemical cells, with polymer or ceramic technology, the stack of electrodes described is arranged in a casing filled with liquid electrolyte or gel in order to form the battery pack which is arranged in a structural component of the vehicle, such as a longitudinal member or a recessed beam.

The implementation of a structural electrochemical storage assembly according to this patent application is complex, requiring ultrasonic welding operations and wet application and hot-pressing methods.

BRIEF SUMMARY

To this end, the invention proposes a structural electrochemical storage assembly for a motor vehicle which comprises at least one electrochemical energy storage device which comprises:

- at least one group of two blocks of solid electrochemical storage elements, in particular of substantially parallelepipedal form, which are connected to each other in series or in parallel, and said blocks being superimposed one above the other, in particular along their respective longitudinal plane, each electrochemical storage element being composed of a cell with solid electrolyte and two external current collection means which are constituted by a negative current collection means and a positive current collection means which surround the cell, said electrochemical storage elements being electrically connected to each other, an electrically insulating sheet being further arranged to separate the electrochemical storage elements which constitute a specific block,
- at least one component which is made of compressible material and which is arranged and compressed between said at least two superimposed blocks of electrochemical storage elements,
- a lateral insulator and

- at least one central current collector which collects the interconnection current between said blocks of electrochemical storage elements.

Furthermore, said structural assembly according to the invention comprises a beam which comprises two recessed profile-members which are open on one of the faces thereof and which are assembled together via their respective open face and along the respective edges thereof, said profile-members containing said electrochemical energy storage device, and said two profile-members being sized and assembled to keep said component, which is made of compressible material and which is arranged between said at least two superimposed electrochemical blocks, compressed in order to ensure the electrical contact between the components of said electrochemical elements of the blocks.

In particular, the contact between the beam and the electrochemical energy storage device is provided by the current collectors of the electrochemical storage elements in the beam which are directly in contact with the inner face of the respective longitudinal wall of said profile-members.

In particular, said electrically insulating sheet is arranged between two electrochemical storage elements, between a current collector of a cell and the immediately adjacent current collector of an adjacent cell.

In particular, the two recessed profile-members are open on one of the longitudinal faces thereof. In particular, they have a straight U-shaped section.

Advantageously according to the invention, said two profile-members are assembled by means of nesting along their edges using fixing means with mutually complementary notches which are located on respective portions of said profile-members which are capable of moving opposite each other. In particular, one of said profile-members comprises on the inner portion of the edges thereof notches which are hollowed out on an end portion of the edges thereof and along a thickness which is less than that of the edges thereof in order to form a stop, and the other profile-member comprises notches which have a shape which complements the shape of the notches of one of said profile-members which are located on the outer portion of the edges thereof and which are hollowed out on an end portion of the edges thereof and along a thickness which is less than that of said edges in order to form a stop.

Preferably according to the invention, said electrochemical energy storage device comprises two groups of two superimposed blocks of electrochemical storage elements and a component which is made of compressible material and which is arranged between the respective blocks of electrochemical storage elements of each group, said groups of two superimposed blocks being arranged leaving between them a free zone which receives said interconnection current collector and where necessary means of a control system of said storage device.

According to a preferred embodiment of the invention, said interconnection current collector comprises a current collection screw.

Advantageously according to the invention, said beam comprises a passage for an end portion of said screw.

Preferably, one of said profile-members comprises a machined portion which forms the passage of said interconnection current collector, in particular said end portion of said screw.

Preferably according to the invention, said beam, in particular said profile-members, are made of extruded aluminum.

According to a preferred embodiment of the invention, said electrochemical storage elements of a specific block are connected together electrically in a series configuration and the blocks are connected together electrically in a parallel configuration.

Preferably according to the invention, a block comprises four electrochemical storage elements which are mounted in series and said blocks are interconnected in parallel so that said electrochemical energy storage device is mounted in accordance with a coupling configuration of the 4P4S type.

According to a specific embodiment of the invention, said component made of compressible material is a sheet or plate which extends at least over the entire surface of the electrochemical device between the blocks. In particular, said component is made of a rubber foam, in particular EPDM rubber foam.

According to a specific embodiment of the invention, the solid electrolyte is a polymer, for example, of the PVDF type.

The invention also relates to a motor vehicle which comprises a structural electrochemical storage assembly as defined above. In particular, said assembly is integrated as a structural component of the body of the vehicle.

The invention also relates to a method for producing a structural electrochemical storage assembly as defined above, wherein a pressure is applied at one side and the other of said beam during assembly in order to assemble said two profile-members of which the beam is composed and to compress said sheet made of compressible material.

Said profile-members are fixed firmly to each other by means of nesting using fixing means with complementary notches which enables the beam with the contents thereof to be kept closed. In particular, the assembly is compressed as far as the respective stops of the two profile-members.

The compressible component compressed in this manner applies a pressure (as a result of the tendency thereof to desire to re-expand) to the electrochemical storage elements of the blocks and thus enables the components to be placed in contact in order to activate the electrochemical process. The electrical contact, in particular negative contact, is ensured by the current collectors, in particular negative current, of the upper and lower electrochemical storage elements in the beam which are placed directly in contact with the inner face of the respective longitudinal wall of the profile-members. In the specific case of negative contact between the beam and the current collectors of the storage elements, the beam thus has negative potential.

Said central current collector which collects the interconnection current is connected to the positive power connector.

BRIEF DESCRIPTION OF THE DRAWINGS

Other features and advantages of the invention will be appreciated from a reading of the following description of specific embodiments of the invention, given by way of non-limiting example, with reference to the appended drawings. In the drawings:

FIG. 6 shows schematically in cross section a structural component of said structural assembly illustrated in FIG. 1.

FIG. 7 shows schematically as a partial perspective view the assembly of components of said structural assembly illustrated in FIGS. 1 to 6.

FIG. 8 shows schematically as a perspective view a structural electrochemical storage assembly according to the invention integrating the various components illustrated in FIGS. 1 to 7.

FIG. 9 shows schematically as a partial perspective view a vehicle which integrates a structural electrochemical storage assembly according to the invention as illustrated in FIG. 8.

DETAILED DESCRIPTION

The orientations expressed in the description of the figures are given with reference to the LVT reference system with reference to the structural electrochemical storage assembly which is integrated in a vehicle, in which L represents the longitudinal direction of said structural assembly, T represents the transverse direction of said assembly and V represents the vertical direction of said assembly.

Furthermore, there is indicated in a corresponding manner a reference system XYZ of the vehicle, in which X represents the front-rear longitudinal direction of the vehicle, orientated toward the rear, Y represents the transverse direction of the vehicle, orientated toward the right, and Z represents the vertical direction orientated toward the upper side of the vehicle.

The figures are discussed together.

Figure 1:
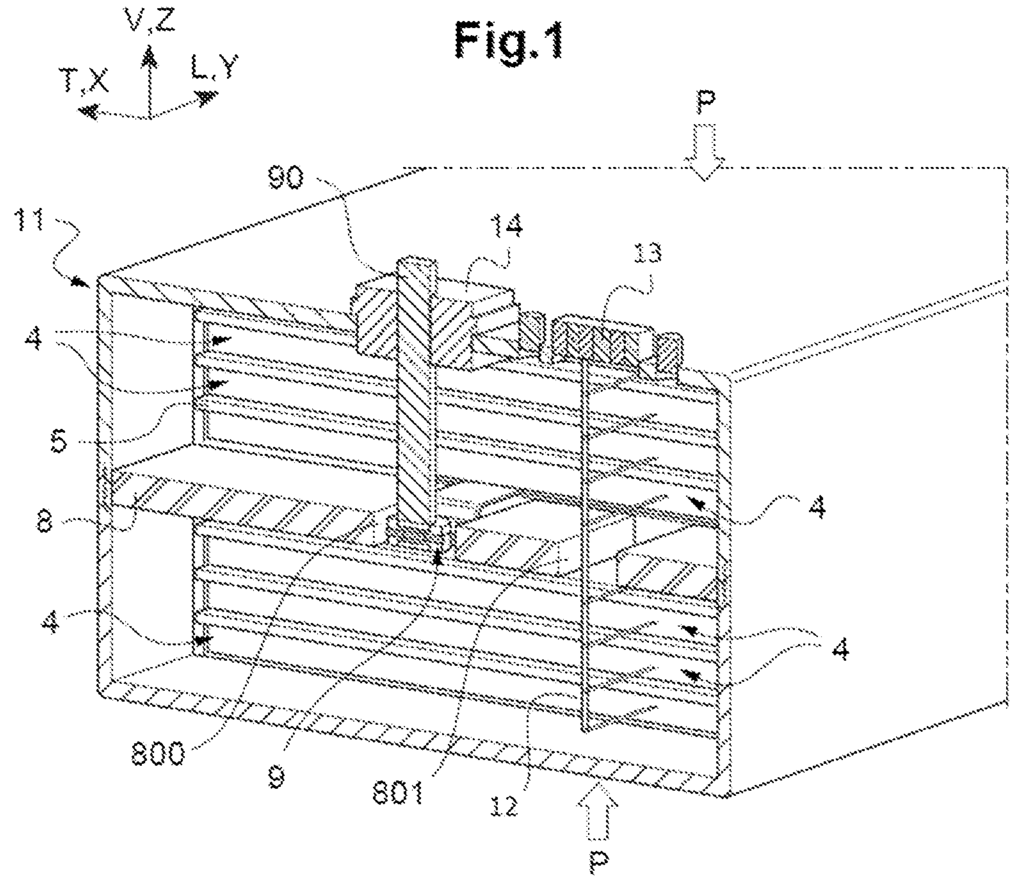
FIG. 1 schematically shows as a cross section in a central plane and as a perspective view a structural electrochemical storage assembly according to the invention.

FIG. 1 illustrates schematically as a cross section in a center plane VT and as a perspective view a portion of a structural electrochemical storage assembly according to the invention. Said assembly is more specifically intended to be part of the structure of a motor vehicle.

Said structural electrochemical storage assembly comprises a beam 11 in which an arrangement of electrochemical blocks 4 which are each composed of completely solid electrochemical storage elements 1 which are separated by electrically insulating sheets 5 is included. According to the example, there are four blocks 4 which are superimposed in pairs and between which there is arranged a compressed sheet 8. The blocks are connected to each other by means of a central current collector 9 which comprises a screw 90. According to the example, said assembly further comprises a system for controlling the electrochemical energy storage device for controlling the battery which said assembly for the motor vehicle will constitute.

The various components and the assembly thereof will be set out in detail below.

Figure 3:
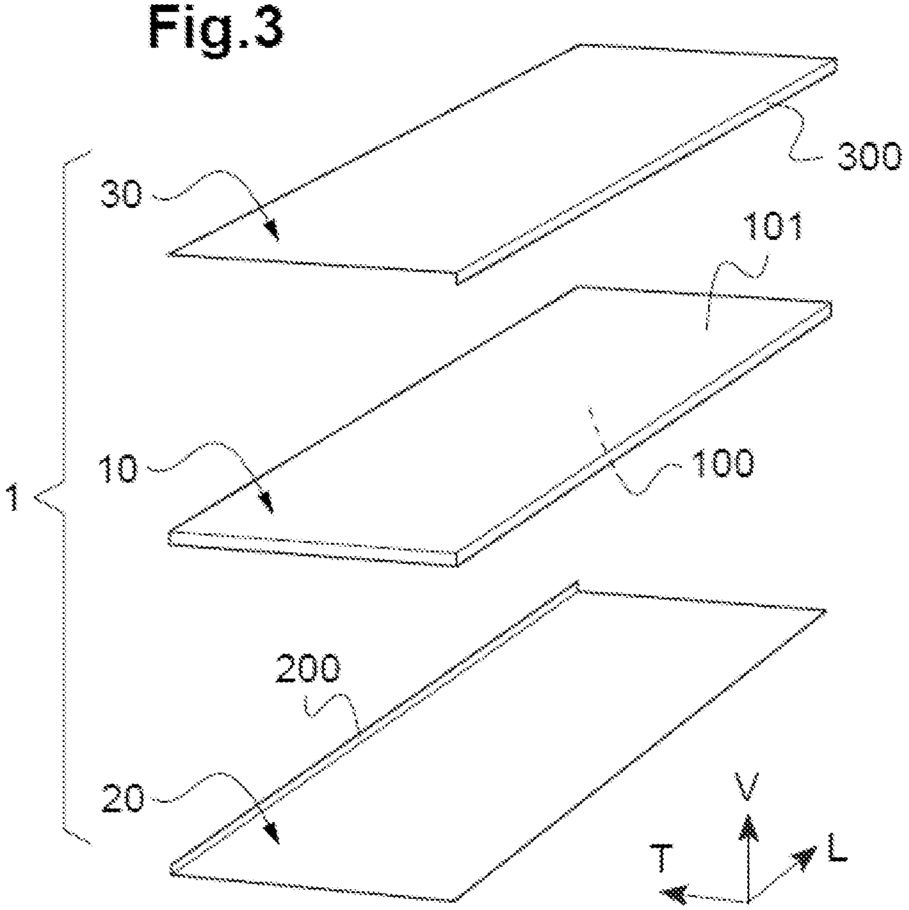
FIG. 3 shows schematically as a partial perspective exploded view components of an electrochemical element of said structural assembly illustrated in FIG. 1 or 2.

FIG. 3 illustrates as an exploded perspective view an example of an electrochemical storage element 1 which is composed of a completely solid electrochemical cell 10 and current collectors 20, 30.

By way of non-limiting example, there is used an electrochemical cell 10 which is a lithium/polymer cell which is constituted by an alternating stack of cathodes and anodes, comprising ten (pure) lithium anodes and nine polymer cathodes. It is parallelepipedal. It is completely solid and there is no liquid electrolyte. It is possible, for example, to use as a polymer for the cathode, a PVDF, for example, such as the one described in the patent application EP3254323. The cell has a nominal voltage of 3.6 V and it has an available current of 30 Ah. The dimensions are 400×100×5 mm.

Said cell 10 is surrounded by a positive aluminum collector 20 and a negative copper collector 30. Each collector 20, 30 is in the form of a plate with the dimensions of the electrochemical cell 10, with a longitudinal, lateral edge which is designated 200, 300, respectively, and which extends over the entire length of the plate, the first collector 20 is placed on a main face 100 of the cell and the other collector 30 is placed on the opposite face 101 and so that said respective lateral edges 200, 300 of the collectors do not border the same side of the cell 10.

Figure 2:
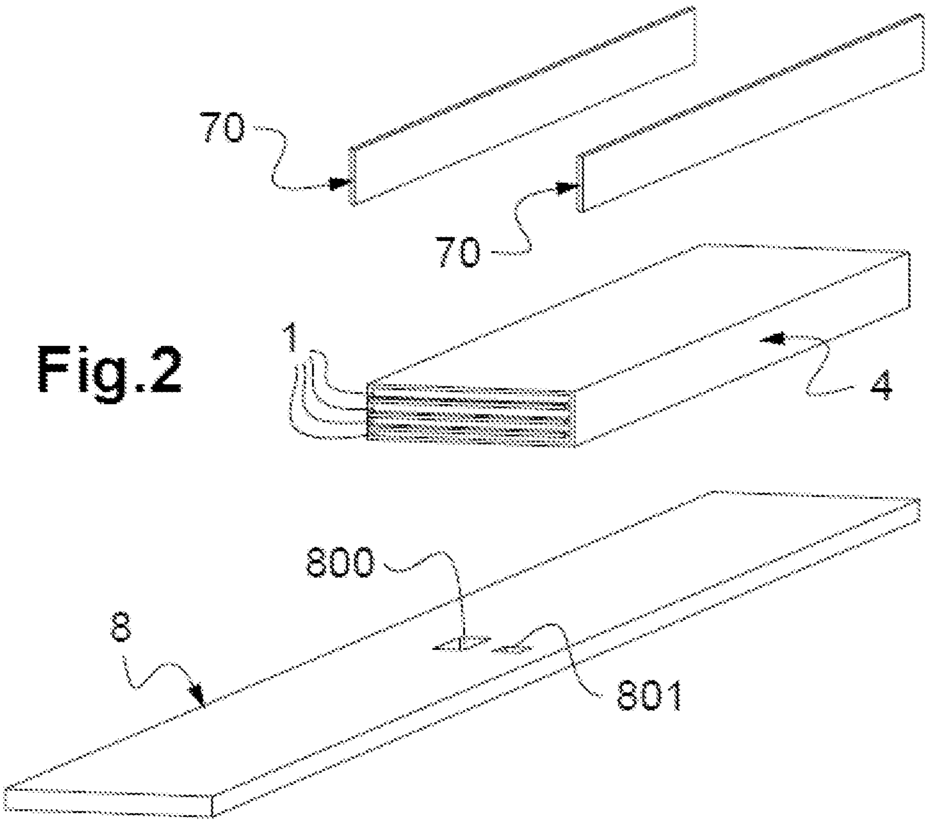
FIG. 2 schematically shows as a partially perspective and exploded view components of said structural assembly illustrated in FIG. 1.

With reference to FIG. 2, an electrochemical block 4 is constituted by a stack of four electrochemical storage elements 1, each element being constituted as described above with reference to FIG. 3. The block thus also has a parallelepipedal shape comprising two main opposing faces, two opposing longitudinal sides and two opposing transverse sides.

Figure 5:
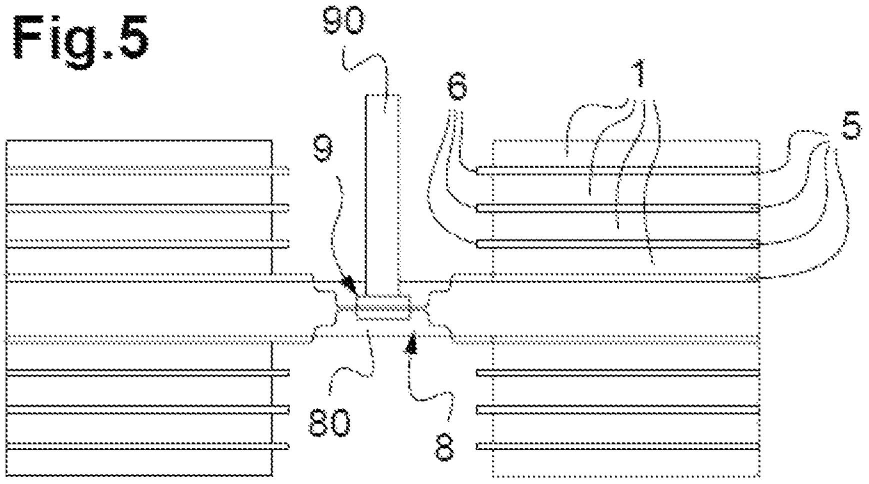
FIG. 5 shows schematically as a cross section in a central plane the assembly illustrated in FIG. 4.

As illustrated more clearly in FIG. 5, each storage element in said block is further insulated on the main faces thereof with material made of an electrically insulating sheet 5, for example, a polyimide film known under the name of "Kapton" (trademark), which is in particular arranged between two adjacent elements.

As illustrated in FIG. 5, the connection between two adjacent electrochemical storage elements 1 of a specific block is produced by a connector 6 made of a bi-component aluminum/copper material, which elements are welded to the respective collectors of said adjacent elements. The electrochemical block thus comprises three connectors.

Said electrochemical elements 1 of the block are mounted in series. Said block thus has a coupling configuration of the type 4S.

Furthermore, said block 4 is provided with lateral plates 70 which are electrically insulating and which are positioned at each side of the electrochemical storage elements of which it is composed.

The electrochemical block 4 is positioned on a compression component 8, according to the example a compressible plate made of EPDM rubber foam. This compression component has a shape and dimensions which are adequate for being inserted in the beam.

Figure 4:
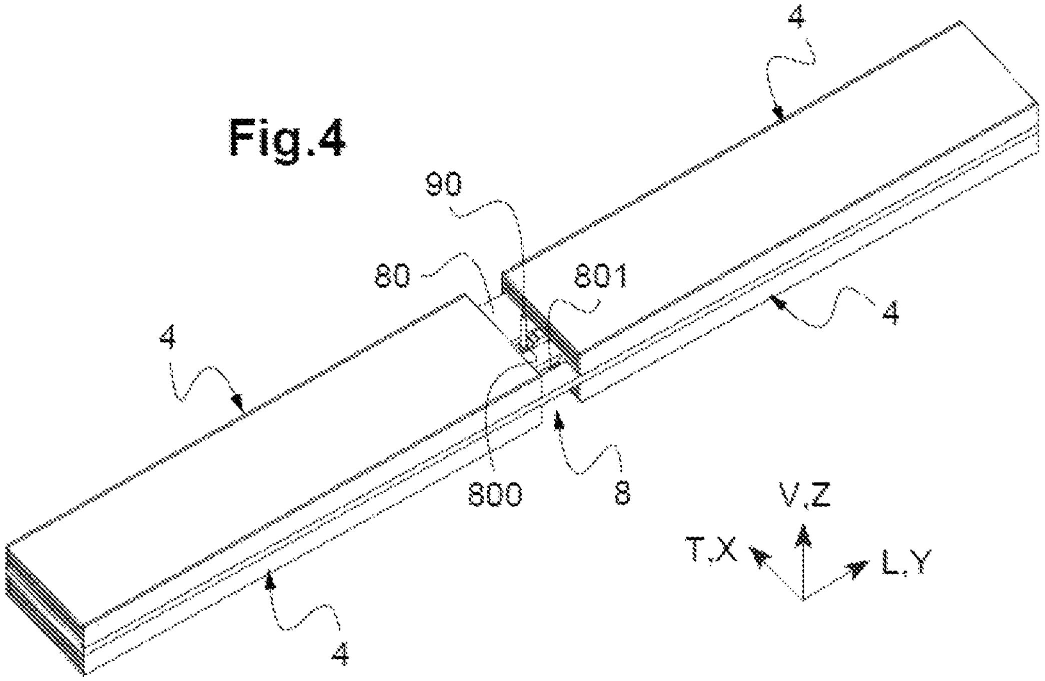
FIG. 4 shows schematically as a partial, perspective view the assembly of components of the electrochemical energy storage device of said structural assembly illustrated in FIGS. 1 to 3.

As illustrated in particular in FIGS. 4 and 5, the electrochemical energy storage device according to the example comprises four electrochemical blocks 4 which are arranged in pairs at one side and the other of this compression component 8. In other words, the blocks 4 are superimposed in pairs around said compressible component 8, and with each group of two blocks being superimposed and separated by said compressible component. According to the invention, these two groups of electrochemical blocks are arranged one behind the other in the longitudinal direction L of a block and of the beam, that is to say, in the transverse direction Y of the vehicle illustrated in FIG. 9 by way of non-limiting example. At the center of said compression component 8, there is a zone 80 between the groups of superimposed blocks which is reserved for installing a central current collector 9 which interconnects the four blocks of electrochemical elements together. This central interconnection current collector is provided with a current collection screw 90. This central zone 80 comprises at least one hole 800 which forms a passage for the various components of said central collector 9, in particular for said current collection screw 90.

The resulting electrochemical storage device thus has a configuration of the type 4P4S (4 blocks in parallel of 4 cells in series).

According to the configured example 4P4S, said storage device has an available current of 120 Ah, a voltage of 14.4 V and an energy of 1.728 kWh.

With reference to FIG. 2, 4 or 1, said central zone 80 of the compression plate 8 further comprises another hole 801 which forms a passage for the various components of an electrical cable bundle 12 which has the function of providing information (of the type involving voltage, temperature, etc.) to the control system of the storage device, a system which is generally referred to as a BMS (Battery Management System).

An insulating plate 71 is positioned at the outer end of each group of two superimposed blocks 4 (see FIG. 7).

After the arrangement described for forming the device with the four electrochemical blocks 4 around the compression sheet 8 have been interconnected and provided with the electrical cable bundle 12, this electrochemical device is placed in a beam 11, as illustrated in FIG. 7, which beam is a structural element of the vehicle.

With reference to FIGS. 6, 7 and 8, the beam 11 comprises a first half-beam 111 and a second half-beam 112 which is provided with machined portions in order to fix the signal connector 13 (machined portion 1123) and the positive power connector (machined portion 1124). Said beam further comprises two end closure elements 113 which are positioned at each end of said beam, that is to say, at the end of the half-beams 111, 112 after they are assembled. According to the example, said half-beams are aluminum extrusions.

Each half-beam 111, 112 has an internally hollow shape. It is in the form of a profile-member with a U-shaped straight section, one of the longitudinal faces thereof is thus open. Each half-beam 111, 112 comprises opposing indentations 1112, 1122 so that they can be kept assembled in accordance with a notch-type closure system, sometimes referred to as a rack. Said indentations are therefore in the form of notches. These indentations extend along the longitudinal edges thereof (U-shaped branches) 1111, 1121, which edges are also referred to as longitudinal edges 1111, 1121. One of the half-beams 111 comprises the indentations 112 thereof on the inner portion of the edges 1111 thereof, which are hollowed out at an end portion of said edges and along a thickness which is less than that of the edges in order to form a stop 11110. The other half-beam 112 comprises the indentations 1122 thereof on the outer portion of the edges 1121 thereof, which are also hollowed out at an end portion of said edges and along a thickness less than that of said edges in order to form a stop 11210. The lower indentations of one of the half-beams can thus nest with the outer indentations of the other half-beams in order to fixedly join the two half-beams to each other, then to assemble them, firmly under pressure.

The electrochemical energy storage device is thus positioned in a first half-beam 111, said device having the shape and the dimensions which are adapted to those inside said half-beam. The other half-beam 112 is then placed above the half-beam 111 containing said electrochemical device in order to close the assembly with a beam 11 being formed. The two half-beams are held together in place using the first notches of the closure system.

With reference to FIG. 1 in particular, the signal connector 13 is positioned in the region of the machined portion 1123 provided for this purpose in the second half-beam 112. A power insulator 14 which is placed around the collector screw 90 of the central current collector 9 is also positioned, in the region of the other machined portion 1124 which is provided for the positive power connector in the second half-beam 112.

The assembly is then placed under a press. The assembly is compressed under a pressure P until the two half-beams 111, 112 move into abutment as far as the respective stops 11110, 11210 thereof. Said half-beams are fixed firmly to each other by means of nesting using the notch system in order to close the beam 11 with the contents thereof.

The compressible component 8 in the central portion is thus compressed. This is what applies a pressure (as a result of the tendency thereof to wish to re-expand) to the electrochemical storage elements 1, in particular electrochemical cells 10 of the blocks 4 which thus enables the constituents of said cells to be placed in contact and which consequently activates the electrochemical process.

The negative contact is in particular ensured by the copper negative current collectors 3 of the upper and lower electrochemical storage elements 1 which are directly in contact with the half-beams 111, 112 made of aluminum. The beam 11 thus has negative potential.

The closure of the beam 11 is terminated by placing the end closure elements 113 at each end of the beam (see FIG. 8). A weld seam is produced, for example, by means of melting along the outer connection line of the two half-beams and between the half-beams and the end closure elements 113.

The wiring 15 and the insulator are then placed on the tip of the screw 90 of the central current collector 9 (see FIG. 8) for the positive power connector.

The beam produced in this manner provides an electrochemical storage assembly which will form a structural element of the vehicle. According to the example illustrated in FIG. 9, the beam is assembled on the body C of the vehicle, in this instance as a front cross-beam. The assembly on the vehicle may, for example, be carried out by means of structural adhesive-bonding or screwing.

The advantage of the completely solid structural electrochemical storage assembly according to the invention is that, particularly in the case of significant deformation of the structure of the vehicle, there is no thermal packaging in the region of the electrochemical device, and that it enables dead spaces to be used in the structure of a vehicle, in particular in aluminum profile-members.

An advantage is also the implementation thereof with a compression component and the use of two half-beams, which have a notch assembly system, which are assembled by means of pressure, which pressure at the same time enables the assembly of the beam and the compressible component to be compressed.

The invention claimed is:

1. A structural electrochemical storage assembly for a motor vehicle, comprising:

a) at least one electrochemical energy storage device which comprises:

at least one group of two blocks of solid electrochemical storage elements which are connected to each other in series or in parallel, and said two blocks of solid electrochemical storage elements being superimposed one above the other, each solid electrochemical storage element being composed of a cell with solid electrolyte and two external current collection means which are constituted by a negative current collection means and a positive current collection means which surround the cell, said solid electrochemical storage elements being electrically connected to each other, and an electrically insulating sheet being further arranged to separate the solid electrochemical storage elements which constitute a specific block of said two blocks of solid electrochemical storage elements, at least one component which is made of compressible material and which is arranged and compressed between said two blocks of electrochemical storage elements, a lateral insulator, and at least one central current collector which collects an interconnection current between said two blocks of electrochemical storage elements, b) a beam which comprises two recessed profile-members which are open on one of the faces thereof and which are assembled together via the respective open face and along respective edges thereof, said two recessed profile-members containing said at least one electrochemical energy storage device of said at least two superimposed blocks of electrochemical storage elements, and said two recessed profile-members being sized and assembled to keep said at least one component, which is made of compressible material and which is arranged between said two superimposed electrochemical blocks, compressed.

2. The structural electrochemical storage assembly as claimed in claim 1, wherein said two recessed profile-members are assembled by nesting along their edges using mutually complementary notches, which are located on the respective edges of said two recessed profile-members.

3. The structural electrochemical storage assembly as claimed in claim 1, wherein said at least one group of two blocks of solid electrochemical storage elements comprises two groups, said two groups being arranged to include a free zone between the two groups, and the free zone receives said at least one central current collector and/or a control system of the at least one electrochemical storage device.

4. The structural electrochemical storage assembly as claimed in claim 1, wherein said at least one central current collector comprises a current collection screw.

5. The structural electrochemical storage assembly as claimed in claim 4, wherein said beam comprises a passage for at least one end portion of said current collection screw.

6. The structural electrochemical storage assembly as claimed in claim 1, wherein said beam is made of extruded aluminum.

7. The structural electrochemical storage assembly as claimed in claim 1, wherein said solid electrochemical storage elements of one of said two blocks of solid electrochemical storage elements are connected together electrically in a series configuration and the two blocks of solid electrochemical storage elements are connected together electrically in a parallel configuration.

8. The structural electrochemical storage assembly as claimed in claim 1, wherein one of the two blocks of solid electrochemical storage elements comprises four electrochemical storage elements which are mounted in series and said two blocks of solid electrochemical storage elements are interconnected in parallel.

9. The motor vehicle comprising:

the structural electrochemical storage assembly as claimed in claim 1.

10. A method for producing the structural electrochemical storage assembly as claimed in claim 1, wherein a pressure is applied at both sides of said beam during assembly in order to assemble said two recessed profile-members of which the beam is composed and to compress said at least one component made of compressible material.

* * * * *